United States Patent [19]

Uhlmann et al.

[11] 4,278,498
[45] Jul. 14, 1981

[54] EARTHQUAKE-PROOF MOUNTING SUPPORT FOR CONTROL-ROD DRIVES OF NUCLEAR REACTORS

[75] Inventors: Gert Uhlmann; Konrad Schramm; Georg Kohler, all of Erlangen, Fed. Rep. of Germany

[73] Assignee: Kraftwerk Union Aktiengesellschaft, Mülheim, Fed. Rep. of Germany

[21] Appl. No.: 957,326

[22] Filed: Nov. 3, 1978

[30] Foreign Application Priority Data

Nov. 4, 1977 [DE] Fed. Rep. of Germany ....... 2749488

[51] Int. Cl.³ .............................................. G21C 7/08
[52] U.S. Cl. .................................... 176/36 R; 176/38
[58] Field of Search ................. 176/36 R, 36 SA, 38; 188/1 C, 1 B

[56] References Cited

U.S. PATENT DOCUMENTS

| | | | |
|---|---|---|---|
| 2,857,056 | 10/1958 | Dilworth | 188/1 C |
| 3,140,982 | 7/1964 | Haines et al. | 176/38 |
| 3,212,979 | 10/1965 | Silverblatt | 176/36 S |
| 3,563,855 | 2/1971 | Marko | 176/38 |
| 3,595,748 | 7/1971 | Frisch et al. | 176/36 R |
| 3,713,971 | 1/1971 | Van Santen et al. | 176/36 R |
| 3,766,006 | 10/1973 | Frisch et al. | 176/36 R |

*Primary Examiner*—S. A. Cangialosi
*Attorney, Agent, or Firm*—Herbert L. Lerner

[57] ABSTRACT

Earthquake-proof mounting support for control rod drives of nuclear reactors having a generally cylindrical reactor pressure vessel formed with a convex wall at least at one end thereof and including control rods with control rod drive shafts coupled thereto and mounted so as to be movable in axial direction thereof within tubular drive housings extending pressure-tightly through the end convex wall and sealed against the outside, the tubular drive housings comprising tube member forming respective feed-through passageways for the control rod drive shafts, the tube members having respective portions thereof extending with respectively varying lengths outside and beyond the convex wall to a given horizontal plane, and a support grid formed of a plurality of grid bars articulatingly connecting the tube members at respective free ends thereof outside the convex wall, respectively, to one another.

12 Claims, 7 Drawing Figures

EARTHQUAKE-PROOF MOUNTING SUPPORT FOR CONTROL-ROD DRIVES OF NUCLEAR REACTORS

The invention relates to an earthquake-proof mounting support control rod drives of nuclear reactors, preferably pressurized-water reactors, including a reactor pressure vessel with a convex vessel cover and also control rods and control rod drive shafts which are coupled thereto and are mounted so as to be movable in axial direction thereof within tubular drive housings extending pressure-tightly through the pressure vessel cover and sealed against the outside, the drive housings including control rod drive stub tubes forming respective feed-through passageways and pressure tube sealingly connected thereto, such as by a flange connection, especially, the control rod drive stub tubes extending with different stub tube lengths above the spherical vessel cover.

From the journal "Kerntechnik, Isotopentechnik und Chemie," 1968, No. 4, pages 217 to 225, especially FIG. 9 (see also the associated reprint pages 1 as well as 7 to 9), control rod drives of the hereinaforementioned type have become known heretofore. The problem underlying the invention is to construct these heretofore known control rod drives with respect to earthquake safety in such a manner that undesirable earthquake vibrations of the control rod drives, including the stub tubes thereof are reliably avoided. A basic beginning is from the realization that certain groups of control rod drives with the same stub tube length, if struck in the resonance-frequency range, can be excited to especially heavy vibrations by the foundation shocks due to an earthquake, whereas others, which are outside the resonance frequency range, are not so excitable. This involves especially transversal vibrations, longitudinal vibrations being only of secondary importance. It is accordingly an object of the invention to provide an earthquake-proof mounting support which will take such transversal vibrations into account.

With the foregoing and other objects in view, there is provided in accordance with the invention, an earthquake-proof mounting support of the type hereinbefore defined which offers a solution for the problem that is presented providing that the upper ends of the pressure tubes are flexibly connected to each other by grid bars of a support grid. Thus, use is made of the fact that the control rod drives individually or in groups vibrate differently with respect to frequency, amplitude and direction in the event of an earthquake or of another phenomenon initiating vibrations. Mutual cancellation of the undesired vibration is thus achieved by means of the invention, or at least a reduction to smaller amplitudes is achieved by mutual attenuation. Through the use of grid link bars, unimpeded thermal movement of the drive housings in the axial direction thereof without mutual interference is achieved whereas, in the event of excitation in transversal direction due to an earthquake, the vibrations are cancelled due to coupling.

In accordance with another feature of the invention, the support grid comprises two subgrids respectively disposed in a lower and an upper grid plane. The vibration suppression is thereby even more effective, and the grid stiffness in the transversal direction is improved.

In accordance with a further feature of the invention, the grid bars of the one grid plane are disposed in rotated relationship to the grid bar direction of the other grid plane. By the term grid, there is understood herein that, in one plane, there are at least two different grid bar directions. The grid bars can therefore be disposed in rectangular, square, rhombic or zig-zag configuration, wherein the hereinaforementioned rotation of the grid direction from the one to the next plane (statically defined truss structure) is especially advantageous. This structure is then stiff or rigid not only in two principal directions of the one grid, but also in other vibration directions which form an angle therewith.

In accordance with an added feature of the invention, one subgrid is disposed in the form of a rectangular raster or screen, especially a square screen, and the other subgrid is formed of diagonal bars, the joints of which lie approximately in a projection of the corners of the one subgrid onto the other subgrid. The square raster or screen for the one subgrid represents the preferred embodiment since, in most cases, also, the control rod drives and the pressure tubes thereof are disposed in the form of such a raster or screen.

In accordance with an additional feature of the invention, the grid bars are divided into halves, and the two grid bar halves are connected together by turnbuckle means. On the one hand, this affords equalization of tolerances in the assembly and, on the other hand, vibration-damping coupling between respective adjacent tubes can be made strong enough without adverse effect on the flexible connection for the relative thermal expansions.

In accordance with another embodiment of the invention the earthquake-proof mounting support when applied to reactor pressure vessels wherein the control rod drives, including drive housings and associated drive shafts, extend pressure-tightly through a spherical bottom wall of the pressure vessel and are disposed with the pressure tubes thereof protruding downwardly and/or in which the free axial length of the drive housings of the control rod drives are approximately equal to one another, preferably for boiling-water reactors, the pressure tubes are articulatingly connected to each other in the vicinity of the lower ends thereof by the grid bars of the support grid in such a manner that the free axial lengths of the drive housings, measured from the outside of the spherical bottom wall or the outside of the spherical cover, respectively, to the grid joint, are different as viewed over the cross section of the support grid.

Other features which are considered as characteristic for the invention are set forth in the appended claims.

Although the invention is illustrated and described herein as embodied in an earthquake-proof mounting support for control-rod drives of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4b is a side elevational view, partly in section, of FIG. 4a;

Figure 1:
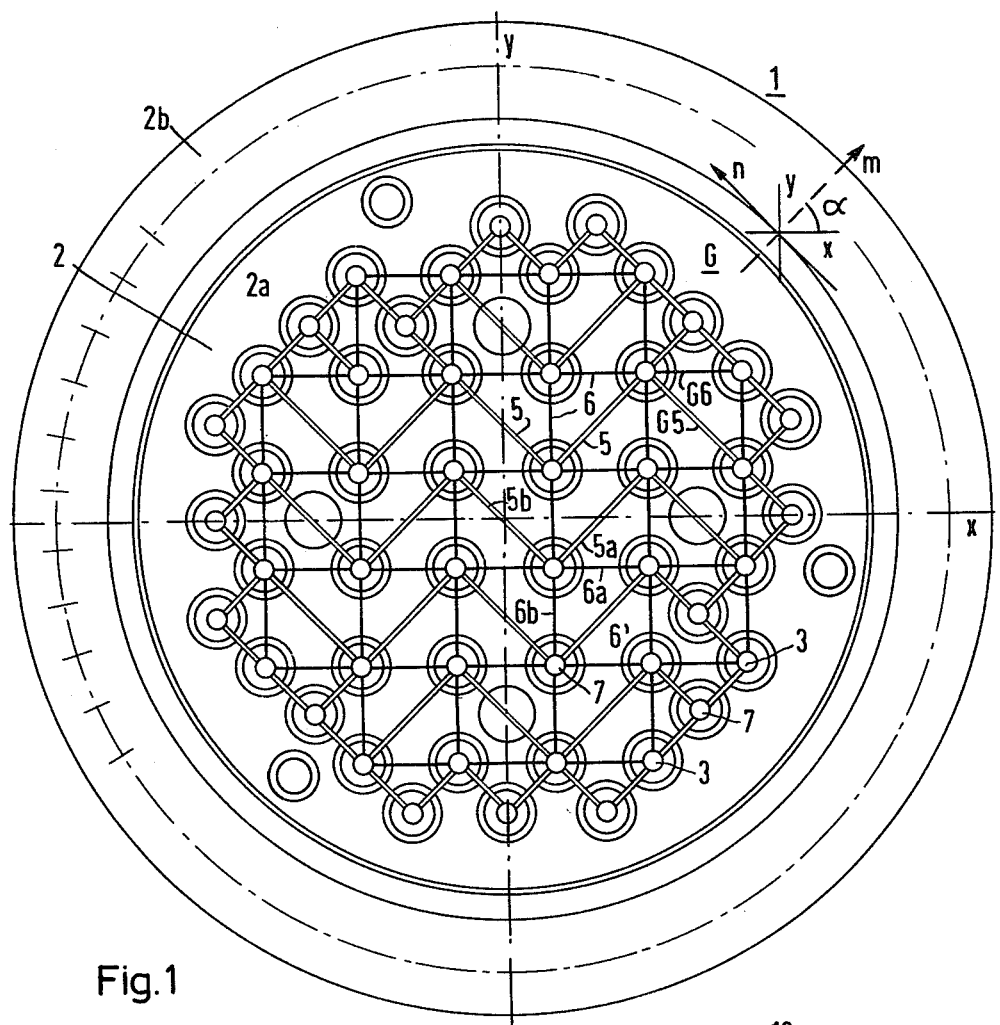
FIG. 1 is a diagrammatic and simplified top plan view of the spherical cover of the pressure vessel of a pressurized-water reactor constructed in accordance with the invention and having control drive pressure tubes which are provided with a support grid.
Figure 5:
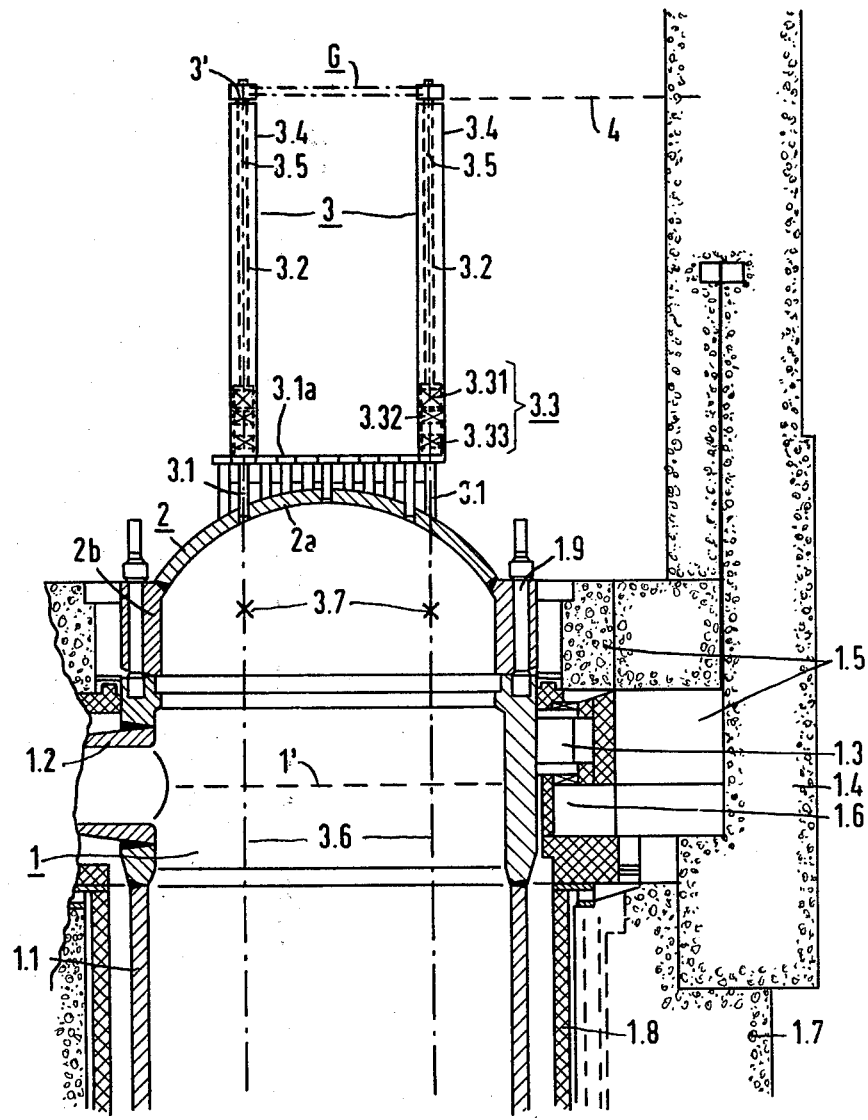
Figure 6:
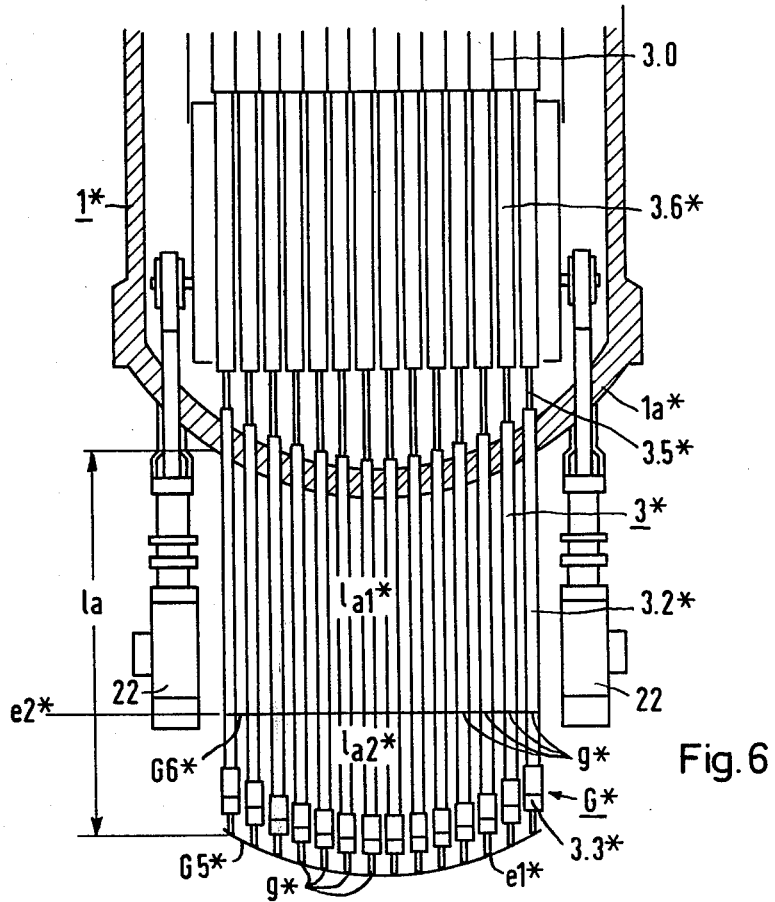

FIG. 5 is a fragmentary vertical sectional view of the pressure vessel in situ and showing the support grid of FIG. 1 in reduced size and in elevational view (first embodiment); and FIG. 6 is a fragmentary diagrammatic vertical sectional view of the bottom of a pressure vessel with a modified form of mounting support, according to the invention, applied to the control rod drives of a boiling-water reactor (second embodiment).

Referring now to the drawing and first, particularly, to FIG. 1 thereof, there is shown a reactor pressure vessel identified as a whole by 1 and having a convex cover 2 having a spherical part or cover calotte 2a and a cover flange 2b. Control rod drives identified as a whole by 3 are connected to the vessel cover 2 in the region of the spherical part or cover calotte 2a thereof by means of control rod drive stub tubes, which are not visible in FIG. 1 since they are covered by the support grid that is yet to be described herein and are indicated only by corresponding raster points. The control rod drives 3 can be seen better in FIG. 5, where only two such control rod drives 3 are shown in the interest of greater clarity in the presentation thereof, each thereof being formed of a control rod drive stub tube 3.1 pressure-tightly extending through the cover 2, and a pressure tube 3.2, which is shown in broken lines and is flanged pressure-tightly to the flanges 3.1a of the stub tubes 3.1 in an otherwise non-illustrated manner. In the interior of the pressure tube 3.2, control drive shafts 3.5 diagrammatically indicated in phantom i.e. by respective dot-dash lines, are mounted so as to be axially shiftable and lockable, and are provided with transverse slots and teeth at the outer periphery thereof. Locking and lifting pawls of an electromagnetic ratchet step lifter 3.3 can be brought into engagement with the peripheral teeth of the control drive shafts 3.5, the pawls being controlled by armatures which are movable, axially limited, against stops within the pressure tube, the actuating coils of the armatures, namely, a lifting coil 3.31, a gripper coil 3.32 and a holding coil 3.33 being slid onto the pressure tube 3.2 at the outside thereof and being mounted within a tubular coil housing 3.4 which surrounds the pressure tube 3.2 coaxially. A respective pressure tube 3.2 and a respective stub tube 3.1 form the drive housing for the control rod drive shafts 3.5. The specific construction of the ratchet step lifter is not essential to the invention of the instant application and is moreover well known, for example, from the German Pat. No. 1,439,948. The control drive shafts are connected to the control rods 3.6, likewise shown as dashdot lines, by couplings which are diagrammatically indicated at 3.7. In addition, the core internals of the pressure vessel 1, and especially the fuel assemblies, which have the absorber channels into which the control rods 3.6 with absorber fingers can be inserted to a greater or lesser extent for the purpose of controlling the reactivity, are not illustrated in the interest of clarity. In FIG. 5, the lower part of the substantially cylindrical hollow pressure vessel 1 is identified as 1.1; also shown is one of the coolant nozzles 1.2 of the vessel that are distributed over the periphery thereof in a plane 1' normal to the axis; additionally shown is one of a number of support lugs 1.3 thereof which are distributed over the periphery of the vessel 1 and by means of which the vessel 1 rests on support brackets 1.6 that are mounted on an annular box girder or beam 1.5 anchored in a concrete structure 1.4 and is secured, as well, against lifting and turning. Also provided is a hollow prestressed-concrete cylinder 1.7 of the biological shield which, with an insulating layer 1.8 fastened to the inner periphery thereof, surrounds the pressure vessel 1 with an annular gap therebetween. Cover studs 1.9 with nuts secure the pressure vessel cover 2a pressure-tightly against the lower vessel part 1.1 and are anchored in the latter.

Due to the curvature of the spherical cover 2a, which is outwardly convex in the illustrated embodiments, considered together with the fact that the flanges 3.1a of the stub tubes 3.1 are disposed in a horizontal connecting plane and the pressure tubes 3.2 of all of control rod drives 3 terminate at a level represented by the broken line 4, the control rod drive stub tubes 3.1 are consequently of different lengths i.e. the total length of the control rod drives 3 with stub tubes 3.1 disposed in the outer zones of the spherical cover part or calotte 2a is greater than that of the control rod drives 3 located in the farther inwardly disposed zones, and the latter control rod drives 3 are, in turn, greater in length than the control rod drives 3 with stub tubes 3.1 that are disposed in the central region of the spherical cover part or calotte 2a. The control rod drives 3, therefore, have different resonance frequencies, depending upon the respective length of the control rod stub tubes 3.1 associated therewith.

Figure 2:
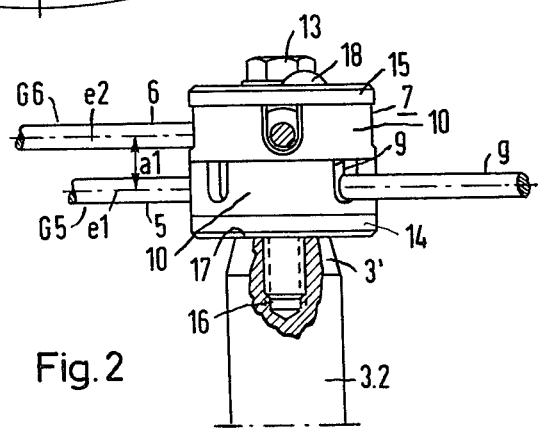
FIG. 2 is an enlarged fragmentary elevational view of FIG. 1 showing the upper end of one of the pressure tubes with a swivel or articulating joint for the bars of the support grid associated therewith.

According to FIGS. 1 and 2 and 5, the upper ends 3' of the control rod drives 3 and the pressure tubes 3.2, respectively, are articulatingly connected to each other by grid bars 5 and 6 of a support grid identified as a whole by G. In the illustrated embodiment, the support grid G is formed of two subgrids G5 and G6 (FIG. 2) which are disposed at a spaced distance al from each other and, respectively, in a lower grid plane el and an upper grid plane e2. The upper subgrid G6 of the plane e2 is disposed in the form of a square screen, the grid bars 6 thereof being indicated in FIG. 1 by solid black lines. The other subgrid G5 of the lower grid plane el is formed by diagonally extending rods 5 which are indicated in FIG. 1 by double lines. The grid joints are identified as a whole in FIGS. 1 and 2 by the reference numeral 7. As is apparent, the joints of the grid bars 5 of the lower subgrid G5 lie approximately in the projection of the corners of the upper subgrid G6 onto the lower subgrid G5. Both subgrids G5 and G6 are disposed in respective horizontal planes and are therefore perpendicular to the vertical pressure tubes 3.1 of the control rod drives 3. Due to the square screen or raster construction of the upper subgrid G6, grid bars 6a extend in X-direction and grid bars 6b in Y-direction. The square grid fields or mesh of the upper subgrid G6 are identified by the reference character 6. In FIG. 1, the coordinate cross or intersection of the two principal directions x and y for the subgrid 6G is shown together with the coordinate cross intersection of the likewise mutually perpendicular principal directions n and m of the subgrid G5, the two coordinate crosses or intersections being rotated relative to each other through and angle $\alpha=45°$. The grid bars of the subgrid G5 extending in the direction m are identified by the reference character 5a and those extending in the direction n by 5b. It is apparent therefrom that the grid bars of the subgrid G5 are disposed in zig-zag fashion i.e. alternatingly in the principal direction m or in the principal direction n, as viewed in the projection of the raster or screen squares 6' onto the subgrid G5. The grid configuration shown has been found to be particularly advantageous for a control rod field with a square screen or raster. Depending upon the intensity of the earthquake that is anticipated, more than two subgrids disposed on top of each other could also be used.

Figure 3:
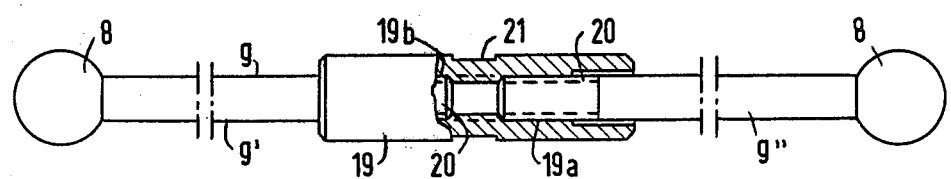
FIG. 3 is a fragmentary, further enlarged view, partly broken away and partly in section, of an individual grid bar of FIG. 2 with spherical knobs at the ends and a turnbuckle in the middle thereof.
Figure 4A:
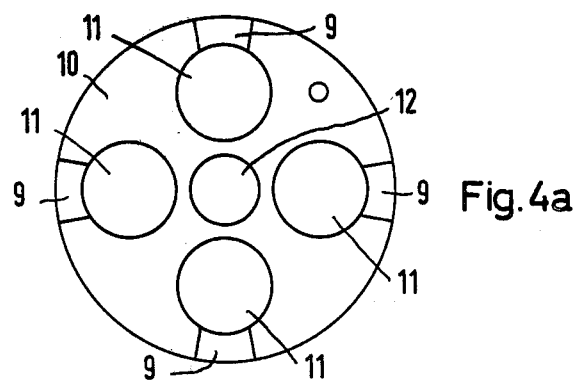
FIG. 4a is an enlarged diagrammatic top plan view of FIG. 2 showing a crosshead plate used for one of the articulating grid joints thereof.
Figure 4B:
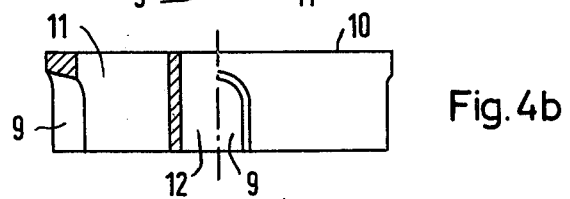

As shown in FIG. 2 in conjunction with FIGS. 3 and 4b, the ends of the grid bars identified as a whole by the reference character g are spherical and, for this purpose, have ball heads 8 (FIG. 3) threadedly secured thereon. The joints 7 constructed as crossheads are fastened to the upper ends 3' of the pressure tubes (see FIG. 2), the grid bars g extending through slots 9 formed in the crosshead plates 10 and being movably supported with the ball heads 8 thereof within cylindrical bores 11 serving as ball joint sockets. FIG. 2 shows that the respective grid joints are formed by two crosshead plates 10, 10 disposed on top of each other and, respectively, provided with ballhead receiving bores 11 and through-slots 9 (FIGS. 4a and 4b) for the grid bars g as well as with a central through-bore 12 for a fastening screw or bolt 13. The bores 11 and 12 and slots 9 formed in the crosshead plates 10, 10 are closed off at the bottom of the joint 7 by a bottom plate 14 and at the top thereof by a cover 15, as viewed in FIG. 2. The pressure tube end 3' is of solid construction and is provided with a central tapped bore 16 for the fastening screw 13 as well as with a flat or planar mounting surface 17. In this manner, a simple and strong means for fastening the grid joint 7 can be attained by providing that the fastening screw 13 disposed in the central bore 12 passes through the crosshead plates 10, 10 together with the bottom plate 14 and the cover 15 and are tightened or clamped against the planar mounting surface 17, a conventional device 18 for preventing unscrewing being advantageously provided at the fastening screw 13, the device 18, in the illustrated embodiment of FIG. 2 being formed of a washer with a bent-up lip engaging one of the lateral flat surfaces of the hexagonal head of the screw 13.

In FIG. 3, the grid bars g are shown divided, and the two grid bar halves g' and g" thereof connected together by means of a turnbuckle 19. The latter is formed of a bushing with an internal thread which is brought into threaded engagement with the threaded shank 20 of the one grid bar half g", for example, by means of a right-hand thread 19a and, accordingly, with the threaded shank 20 of the other grid bar half g' by means of a left-hand thread 19b. At the outer periphery of the threaded bushing 19, a region having a polygonal cross section 21, for example, a hexagonal section, is provided for engagement by wrenches.

In the embodiment according to FIG. 6, a pressure vessel 1* of a boiling-water nuclear reactor is shown with a spherical bottom part of calotte 1a*, through which control rod drives 3* with respective pressure tubes 3.2* extend in a pressuretight manner and project downwardly and out of the pressure vessel 1* with an axial length $1_a$ which is substantially the same for all of the control rod drives 3*. Tubular control rod drive shafts 3.5* are supported within the pressure tubes 3.2* so as to be movable lengthwise yet secured against rotation. They can be moved in axial direction, for example, hydraulically or, in combination, electrically and hydraulically by means of drive units 3.3* connected to the pressure tubes 3.2*, absorber rods 3.6* connected to the upper ends thereof being insertable to a lesser or greater extent into intermediate spaces (absorber channels) located between the fuel assemblies 3.0 for thereby controlling the reactivity in the manner explained hereinbefore in connection with the first embodiment of the invention shown in FIG. 5. The pressure tubes 3.2* include the feedthrough stub tubes like those at 3.1 in FIG. 5, but not shown separately in FIG. 6 and, together with the drive units 3.3*, form thimble-like tubular drive housings which are pressure-tight against the outside. Details of the construction of the drive units 3.3* are of no special significance for the invention of the instant application, and can be obtained, for example, from the German Pat. No. 1,169,596. It is important that also in this second embodiment of FIG. 6, earth-quake caused transversal vibrations of the control rod drives 3* having lengths $1_a$ extending downwardly from the outwardly curving or convex sperical bottom part or calotte 1a* which would basically behave like spring rods clamped at one end thereof, are effectively prevented or reduced to harmless values, by providing that the drive housings be flexibly or articulatingly connected to each other in the vicinity of the lower or free ends thereof by grid bars g* of the support grid G* in such a manner that the free axial lengths $1_{a1}*$ of the drive housings, as measured from the outside of the spherical bottom part of calotte 1a* to the grid joint G6* are different as viewed over the cross section of the support grid G*. For this purpose, an upper subgrid G6* is provided which is disposed in an upper grid plane e2* and may be constructed like the hereinabove-described grid G6 of FIG. 2. The lower subgrid G5, however, is not disposed in a flat plane but in a curved surface e1* which corresponds substantially to the contour of the spherical cover part or calotte 1a*, because all of the drive housings have the same overall length $1_a$. Further length sections $1_{a2}*$ of the drive housings are thus provided between the two subgrids G6* and G5*, the respective lengths of which are likewise different as viewed over the cross section of the control rod field. Within the length sections $1_{a1}*$ as well as the length sections $1_{a2}*$, drive housings of different length are coupled flexibly or articulatingly to each other through the subgrids G6* and G5* and also in a vibration-attenuating or vibration-cancelling manner because of the different resonance frequencies of the coupled length sections $1_{a1}*$, $1_{a2}*$. The subgrid G5* can be constructed in plan view like the hereinaforedescribed subgrid G5 of FIG. 2; in addition, however, the bars g* of the subgrid G5* extend inclined to the horizontal. For the subgrid G6*, the crossheads, which are not shown in FIG. 6, are hollow-cylindrical, the pressure tubes 3.2* passing through them, the crossheads being fastened at the outer periphery of the pressure tubes 3.2*. On the other hand, the crossheads for the subgrid G5* can, in principle, be constructed as described heretofore in connection with FIG. 2. Internal main reactor coolant pumps 22 are further shown in FIG. 6.

The invention of the instant application is also applicable to control rod drives which are disposed in the spherical bottom part of calotte of a pressure vessel but have free ends thereof which extend, in a manner deviating from that of FIG. 6 and in accordance with FIG. 5, up to a common horizontal end plane, so that the lengths $1_a$ of the drive housings extending out of the pressure vessel are inherently different. In such a case, the support grid construction of the first embodiment of FIG. 5 can again be used, but then, however, at the underside of the pressure vessel rather than at the top thereof.

We claim:

1. Earthquake-proof mounting support for control rod drives of nuclear reactors having a generally cylindrical reactor pressure vessel formed with a convex wall at least at one end thereof and including control rods with control rod drive shafts coupled thereto and mounted so as to be movable in axial direction thereof within tubular drive housings extending pressure-tightly through the end convex wall and sealed against the outside, the control rod drive shafts having free ends, and means for connecting the free ends of the control rod drive shafts to one another, the tubular drive housings comprising tube members forming respective feed-through passageways for the control rod drive shafts, said tube members having respective portions thereof extending with respectively varying lengths outside and beyond the convex wall to a given horizontal plane, the connecting means comprising a support grid formed of a plurality of grid bars articulatingly connecting said tube members at respective free ends thereof outside the convex wall, respectively, to one another.

2. Mounting support according to claim 1 wherein the convex wall is formed in a cover of the pressure vessel located at the top thereof, said tube members being formed of control rod drive stub tubes extending upwardly out of said cover and pressure tubes sealingly connected at one end thereof, respectively, to said stub tubes, said respective portions of said tube members being said control rod drive stub tubes, said horizontal plane extending through respective locations at which said pressure tubes are sealingly connected at said one end thereof to said stub tubes.

3. Mounting support according to claim 2 wherein said support grid is formed of at least two subgrids spaced from one another and disposed in respective upper and lower grid planes.

4. Mounting support according to claim 3 wherein the grid bars in one of said grid planes are disposed in rotated relationship to the direction of the grid bars in the other of said grid planes.

5. Mounting support according to claim 3 wherein one of said subgrids is in the form of a rectangular screen, and the other of said subgrids is formed of diagonal rods, the articulatingly connected grid bars having joints disposed approximately in a projection of the corners of said one subgrid onto said other subgrid.

6. Mounting support according to claim 2 wherein said grid bars are formed with respective ball-shaped ends, and including crossheads fastened to the respective upper ends of said pressure tubes, said grid bars being articulatingly mounted, respectively, in said crossheads.

7. Mounting support according to claim 6, said grid bars being articulatingly mounted at respective grid joints formed of two superimposed crosshead plates respectively formed with bores for receiving the ball-shaped ends of said grid bars therein and with feed-through slots for said grid bars as well as a central throughbore for a threaded fastener.

8. Mounting support according to claim 7 including a base plate for closing off said bores and slots formed in said crosshead plates at the bottom of the respective joint and a cover plate for closing off the bores and slots at the top of said joint, said end of said pressure tube being of solid construction and being formed with a planar supporting surface as well as with a central threaded bore for threadedly receiving said threaded fastener therein, said crosshead plates together with said base plate and cover plate being penetrated by said threaded fastener and tightened thereby against said planar supporting surface.

9. Mounting support according to claim 8 including respective means for preventing unscrewing operatively engaging said threaded fastener.

10. Mounting support according to claim 2 wherein said grid bars are respectively divided into grid bar halves, and including respective turnbuckle means for connecting the halves of the respective grid bars to one another.

11. Mounting support according to claim 10 wherein said turnbuckle means comprise an internally threaded bushing formed both with a right-hand thread that is threadedly engaged with an externally threaded shaft of one of said grid bar halves, and with a left-hand thread that is threadedly engaged with an externally threaded shaft of the other of said grid bar halves.

12. Mounting support according to claim 1 wherein the convex wall is formed at the bottom of the pressure vessel, and said tube members are formed of pressure tubes extending downwardly out of said bottom of said pressure vessel, said tubular drive housings each having a free axial length extending out of said pressure vessel that is substantially equal to one another, said free ends of said pressure tubes being the lower ends thereof in vicinity of which they are articulatingly connected at respective joints in said given horizontal plane by said grid bars of said support grid so that said free axial lengths of said tubular drive housings, as measured from the outside of said bottom convex wall to said joints, varies over the cross section of said support grid.

* * * * *